United States Patent
Negle et al.

(10) Patent No.: US 11,778,031 B2
(45) Date of Patent: Oct. 3, 2023

(54) SERVICE MODEL MANAGEMENT REQUEST

(71) Applicant: NOKIA SOLUTIONS AND NETWORKS OY, Espoo (FI)

(72) Inventors: Klaus Negle, Landsberg am Lech (DE); Uwe Rauschenbach, Munich (DE); Jürgen Goerge, Neuried (DE)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 17/752,723

(22) Filed: May 24, 2022

(65) Prior Publication Data

US 2022/0385728 A1 Dec. 1, 2022

Related U.S. Application Data

(60) Provisional application No. 63/192,947, filed on May 25, 2021.

(51) Int. Cl.
*H04L 67/12* (2022.01)
*H04L 67/55* (2022.01)
*H04L 41/12* (2022.01)

(52) U.S. Cl.
CPC ............. *H04L 67/12* (2013.01); *H04L 41/12* (2013.01); *H04L 67/55* (2022.05)

(58) Field of Classification Search
CPC ......... H04L 67/12; H04L 41/12; H04L 67/55; H04L 41/145; H04L 41/5054; H04L 41/5045
See application file for complete search history.

(56) References Cited

U.S. PATENT DOCUMENTS

| | | | |
|---|---|---|---|
| 2011/0040895 A1* | 2/2011 | Griffin | H04L 67/567 709/248 |
| 2016/0210578 A1* | 7/2016 | Raleigh | H04W 88/08 |
| 2016/0294646 A1* | 10/2016 | Kirner | H04L 43/10 |

OTHER PUBLICATIONS

ETSI GS ZSM 002 V1.1.1 (Aug. 2019), ETSI Group Specification, Zero-touch network and Service Management (ZSM); Reference Architecture, 80 pages.

(Continued)

*Primary Examiner* — Benjamin M Thieu
(74) *Attorney, Agent, or Firm* — SQUIRE PATTON BOGGS (US) LLP

(57) ABSTRACT

Systems, methods, apparatuses, and computer program products for a service model management request. The method may include receiving an end-to-end network service model for network services. The method may also includes determining a set of domain services that are required to be able to provide an end-to-end network service defined by the end-to-end network service model. The method may further include checking whether at least one management domain is capable of providing the required set of domain services. The method may also include requesting, when the at least one management domain is not capable of providing the required set of domain services, to prepare the at least one management domain to become able to provide the required set of domain services. In addition, the method may include receiving a notification from the at least one management domain indicating an availability to provide the required set of domain services.

24 Claims, 8 Drawing Sheets

(56) References Cited

OTHER PUBLICATIONS

Draft ETSI GS ZSM 008 V0.6.5 (Apr. 2021), ETSI Group Specification, Zero-Touch Network and Service Management (ZSM); Cross-domain E2E Service Lifecycle Management, 54 pages.
ETSI ZSM(21)000131r1, ZSM008—Additional step in onboarding procedure, Ericsson LM, Mar. 28, 2021, ZSM-14hTech call, 3 pages.
TM Forum Specification, Service Catalog Management API REST Specification, TMF633 Team Approved Date: Oct. 12, 2020, Release Status: Production Version 4.0.0, Approval Status: TM Forum Approved IPR Mode: Rand, 120 pages.
European Search Report issued in corresponding European Patent Application No. 22173996.4-1216 dated Oct. 20, 2022.
Ericsson LM, "ZSM008—Additional Step in Onboarding Procedure", ETSI Draft; ZSM(21) 000131, European Telecommunications Standards Institute (ETSI), vol. ISG ZSM Zero Touch Network and Service Management, Mar. 19, 2021, pp. 1-3, XP014390772, 3 pages.
Nokia Germany, "Draft GS ZSM008 V 0.6.5 for proofreading", ETSI Draft, ZSM(21)000159, European Telecommunications Standards Institute (ETSI), vol. ISG ZSM Zero-Touch network and service management, Apr. 19, 2021, pp. 1-59, XP014407814, 59 pages.
Nokia Germany, "ZSM008 Add Step to Onboarding", ETSI Draft, ZSM(21)000268, vol. ISG-ZSM, Aug. 4, 2021, XP014421966, 4 pages.
Nokia Germany, "ZSM002 align catalogue management services", ZSM(19)000071, ETSI Draft, vol. ISG ZSM Zero touch network and Service Managment, Feb. 28, 2019, XP014337683, 2 pages.

* cited by examiner

SERVICE MODEL MANAGEMENT REQUEST

CROSS-REFERENCE TO RELATED APPLICATION

This application claims priority from U.S. provisional patent application No. 63/192,947 filed on May 25, 2021. The contents of this earlier filed application are hereby incorporated by reference in their entirety.

FIELD

Some example embodiments may generally relate to mobile or wireless telecommunication systems, such as Long Term Evolution (LTE) or fifth generation (5G) radio access technology or new radio (NR) access technology, or other communications systems. For example, certain example embodiments may relate to apparatuses, systems, and/or methods for a service model management request.

BACKGROUND

Examples of mobile or wireless telecommunication systems may include the Universal Mobile Telecommunications System (UMTS) Terrestrial Radio Access Network (UTRAN), Long Term Evolution (LTE) Evolved UTRAN (E-UTRAN), LTE-Advanced (LTE-A), MulteFire, LTE-A Pro, and/or fifth generation (5G) radio access technology or new radio (NR) access technology. Fifth generation (5G) wireless systems refer to the next generation (NG) of radio systems and network architecture. 5G network technology is mostly based on new radio (NR) technology, but the 5G (or NG) network can also build on E-UTRAN radio. It is estimated that NR will provide bitrates on the order of 10-20 Gbit/s or higher, and will support at least enhanced mobile broadband (eMBB) and ultra-reliable low-latency-communication (URLLC) as well as massive machine type communication (mMTC). NR is expected to deliver extreme broadband and ultra-robust, low latency connectivity and massive networking to support the Internet of Things (IoT). With IoT and machine-to-machine (M2M) communication becoming more widespread, there will be a growing need for networks that meet the needs of lower power, low data rate, and long battery life. It is noted that, in 5G, the nodes that can provide radio access functionality to a user equipment (i.e., similar to Node B in UTRAN or eNB in LTE) are named gNB when built on NR technology and named NG-eNB when built on E-UTRAN radio.

SUMMARY

Some example embodiments may be directed to a method. The method may include receiving an end-to-end network service model for network services. The method may also include determining a set of domain services that are required to be able to provide an end-to-end network service defined by the end-to-end network service model. The method may further include checking whether at least one management domain is capable of providing the required set of domain services. In addition, the method may include requesting, when the at least one management domain is not capable of providing the required set of domain services, to prepare the at least one management domain to become able to provide the required set of domain services. Further, the method may include receiving a notification from the at least one management domain indicating an availability to provide the required set of domain services.

Other example embodiments may be directed to an apparatus. The apparatus may include at least one processor and at least one memory including computer program code. The at least one memory and computer program code may also be configured to, with the at least one processor, cause the apparatus at least to receive an end-to-end network service model for network services. The apparatus may also be caused to determine a set of domain services that are required to be able to provide an end-to-end network service defined by the end-to-end network service model. The apparatus may further be caused to check whether at least one management domain is capable of providing the required set of domain services. In addition, the apparatus may be caused to request, when the at least one management domain is not capable of providing the required set of domain services, to prepare the at least one management domain to become able to provide the required set of domain services. Further, the apparatus may be caused to receive a notification from the at least one management domain indicating an availability to provide the required set of domain services.

Other example embodiments may be directed to an apparatus. The apparatus may include means for receiving an end-to-end network service model for network services. The apparatus may also include means for determining a set of domain services that are required to be able to provide an end-to-end network service defined by the end-to-end network service model. The apparatus may further include means for checking whether at least one management domain is capable of providing the required set of domain services. In addition, the apparatus may include means for requesting, when the at least one management domain is not capable of providing the required set of domain services, to prepare the at least one management domain to become able to provide the required set of domain services. Further, the apparatus may include means for receiving a notification from the at least one management domain indicating an availability to provide the required set of domain services.

In accordance with other example embodiments, a non-transitory computer readable medium may be encoded with instructions that may, when executed in hardware, perform a method. The method may include receiving an end-to-end network service model for network services. The method may also include determining a set of domain services that are required to be able to provide an end-to-end network service defined by the end-to-end network service model. The method may further include checking whether at least one management domain is capable of providing the required set of domain services. In addition, the method may include requesting, when the at least one management domain is not capable of providing the required set of domain services, to prepare the at least one management domain to become able to provide the required set of domain services. Further, the method may include receiving a notification from the at least one management domain indicating an availability to provide the required set of domain services.

Other example embodiments may be directed to a computer program product that performs a method. The method may include receiving an end-to-end network service model for network services. The method may also include determining a set of domain services that are required to be able to provide an end-to-end network service defined by the end-to-end network service model. The method may further include checking whether at least one management domain is capable of providing the required set of domain services. In addition, the method may include requesting, when the at least one management domain is not capable of providing the required set of domain services, to prepare the at least one management domain to become able to provide the required set of domain services. Further, the method may include receiving a notification from the at least one management domain indicating an availability to provide the required set of domain services.

Other example embodiments may be directed to an apparatus that may include circuitry configured to receive an end-to-end network service model for network services. The apparatus may also include circuitry configured to determine a set of domain services that are required to be able to provide an end-to-end network service defined by the end-to-end network service model. The apparatus may further include circuitry configured to check whether at least one management domain is capable of providing the required set of domain services. In addition, the apparatus may include circuitry configured to request, when the at least one management domain is not capable of providing the required set of domain services, to prepare the at least one management domain to become able to provide the required set of domain services. Further, the apparatus may include circuitry configured to receive a notification from the at least one management domain indicating an availability to provide the required set of domain services.

Other embodiments may be directed to a method. The method may include receiving, from an end-to-end service management domain, a request to check whether a required service model is listed in a management domain service catalogue. The method may also include determining whether the required service model is available. The method may further include transmitting a notification to the end-to-end service management domain on availability of the required service model based on the determination.

Other example embodiments may be directed to an apparatus. The apparatus may include at least one processor and at least one memory including computer program code. The at least one memory and computer program code may be configured to, with the at least one processor, cause the apparatus at least to receive, from an end-to-end service management domain, a request to check whether a required service model is listed in a management domain service catalogue. The apparatus may also be caused to determine whether the required service model is available. The apparatus may further be caused to transmit a notification to the end-to-end service management domain on availability of the required service model based on the determination.

Other example embodiments may be directed to an apparatus. The apparatus may include means for receiving, from an end-to-end service management domain, a request to check whether a required service model is listed in a management domain service catalogue. The apparatus may also include means for determining whether the required service model is available. The apparatus may further include means for transmitting a notification to the end-to-end service management domain on availability of the required service model based on the determination.

In accordance with other example embodiments, a non-transitory computer readable medium may be encoded with instructions that may, when executed in hardware, perform a method. The method may include receiving, from an end-to-end service management domain, a request to check whether a required service model is listed in a management domain service catalogue. The method may also include determining whether the required service model is available. The method may further include transmitting a notification to the end-to-end service management domain on availability of the required service model based on the determination.

Other example embodiments may be directed to a computer program product that performs a method. The method may include receiving, from an end-to-end service management domain, a request to check whether a required service model is listed in a management domain service catalogue. The method may also include determining whether the required service model is available. The method may further include transmitting a notification to the end-to-end service management domain on availability of the required service model based on the determination.

Other example embodiments may be directed to an apparatus that may include circuitry configured to receive, from an end-to-end service management domain, a request to check whether a required service model is listed in a management domain service catalogue. The apparatus may also include circuitry configured to determine whether the required service model is available. The apparatus may further include circuitry configured to transmit a notification to the end-to-end service management domain on availability of the required service model based on the determination.

BRIEF DESCRIPTION OF THE DRAWINGS

For proper understanding of example embodiments, reference should be made to the accompanying drawings, wherein.

DETAILED DESCRIPTION

It will be readily understood that the components of certain example embodiments, as generally described and illustrated in the figures herein, may be arranged and designed in a wide variety of different configurations. The following is a detailed description of some example embodiments of systems, methods, apparatuses, and computer program products for a service model management request.

The features, structures, or characteristics of example embodiments described throughout this specification may be combined in any suitable manner in one or more example embodiments. For example, the usage of the phrases "certain embodiments," "an example embodiment," "some embodiments," or other similar language, throughout this specification refers to the fact that a particular feature, structure, or characteristic described in connection with an embodiment may be included in at least one embodiment. Thus, appearances of the phrases "in certain embodiments," "an example embodiment," "in some embodiments," "in other embodiments," or other similar language, throughout this specification do not necessarily refer to the same group of embodiments, and the described features, structures, or characteristics may be combined in any suitable manner in one or more example embodiments.

Figure 1:
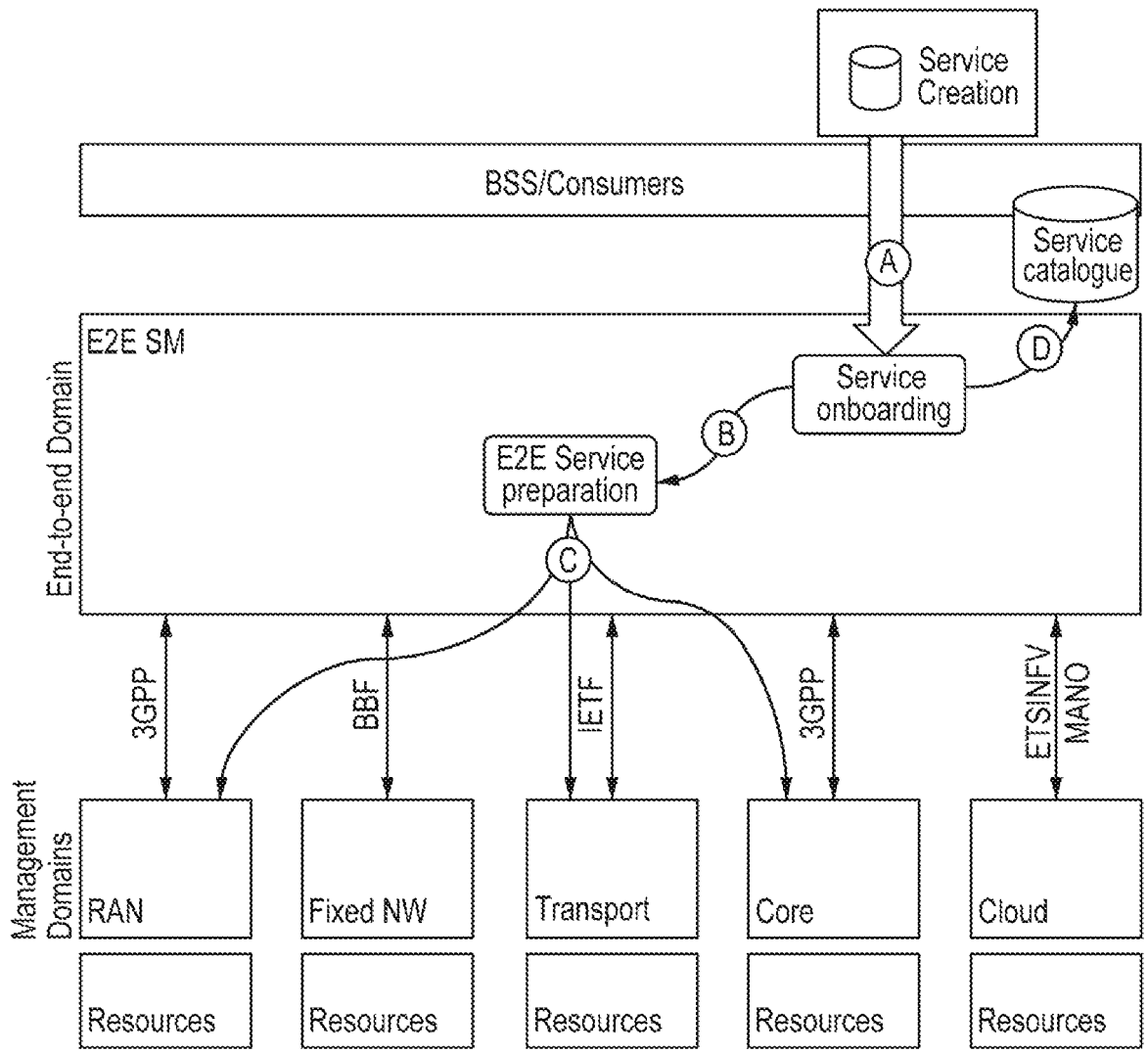
FIG. 1 illustrates example end-to-end (E2E) service managed by an E2E service management domain.

European Telecommunications Standards Institute (ETSI) zero-touch network and service management (ZSM) defines the interworking of a (primary) end-to-end (E2E) service management domain (SMD) with a number of (subordinate) management domains (MDs) which, for example, may represent a technology domain such as radio access network (RAN), transport core, geographical domain, or administrative domain. FIG. 1 illustrates an example E2E service managed by the E2E SMD. In particular, in the example of FIG. 1, the E2E service may be composed of multiple domain services managed by one or more MDs. For example, the service(s) may not be limited to any specific service, and may include, for example communication services, network slices, etc. In some cases, the service provider may compose an E2E communication service by several services from, for example, the radio access network (RAN), core network, several transport networks, and computing resources in the cloud. Each of these network domains may be managed by a dedicated MD. Thus, the management system for the E2E service may communicate with the several management systems for each domain.

Figure 2:
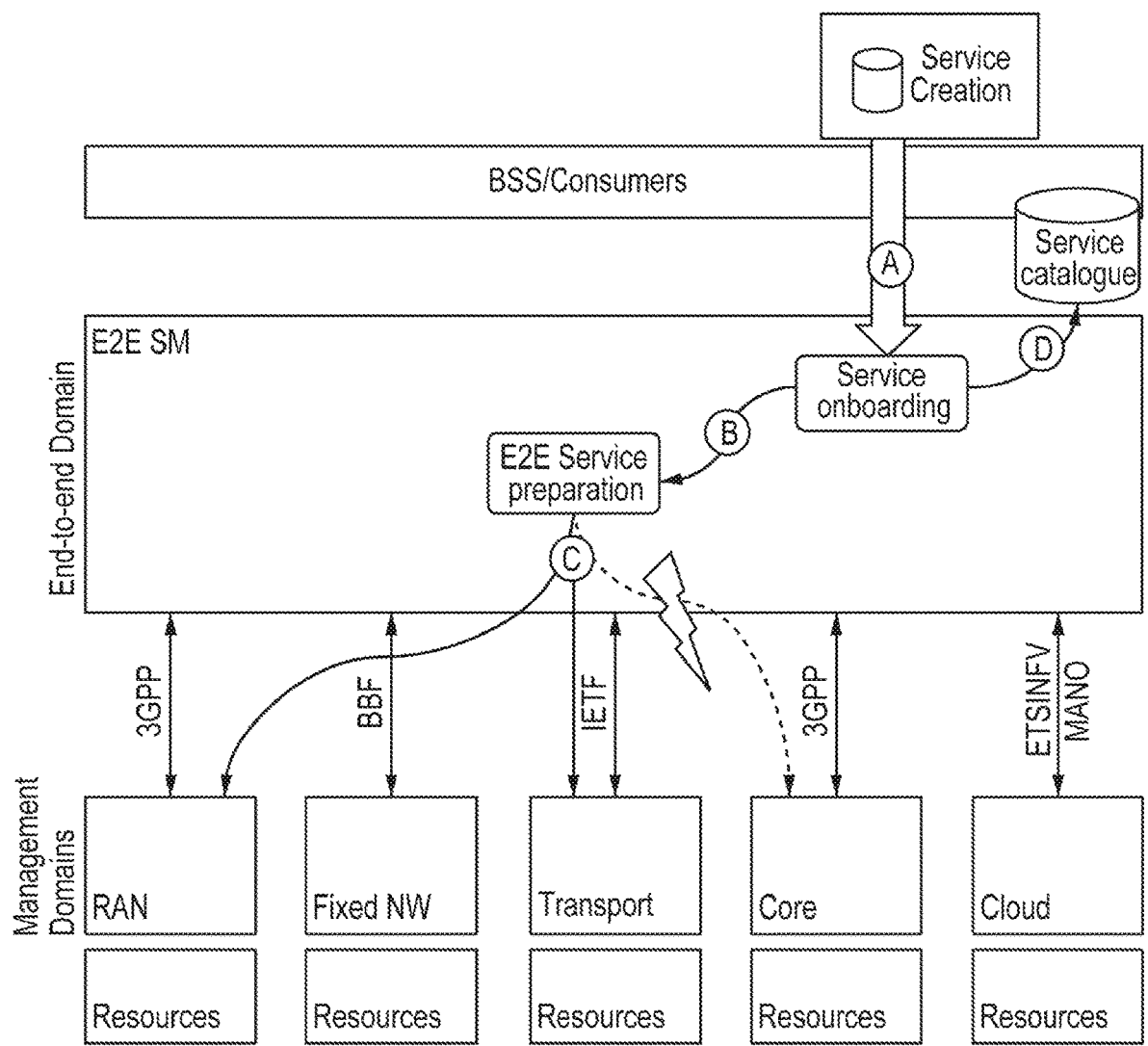
FIG. 2 illustrates the onboarding of an E2E service model that requires three domain service models in different management domains of which one is not available.

FIG. 2 illustrates the onboarding of an E2E service model that requires three domain service models in different management domains of which one is not available. In particular, the example of FIG. 2 illustrates a required service model in a MD "core" that is not available in the service catalogue of that domain. As illustrated in FIG. 2, at (A), an E2E service model resulting from a service design step may be onboarded into the E2E SMD. The service design step may include a process that generates a model that may be used to generate a service template needed for a service instantiation. This template may define in which way a service instance is to be created. Furthermore, the service design may be executed by the network operator's personnel, and may be a tool-supported manual process. When the service design step is onboarded, the service model may be incorporated into the E2E service management entity. The onboarding may also include generating the service catalogue entry which allows in a next step, the ordering or instantiation of the service. In some cases, the service model and template may need to be validated before being used. Thus, the onboarding process may import the outcome of the service design step into the ZSM framework and prepare the ZSM framework for automatically managing the onboarded service by the ZSM framework.

After validating the provided service model, the E2E SMD may prepare (B) for the instantiation of the new E2E service by checking if the MDs can provide required services from which the E2E service is composed (C). This may be done by checking the service catalogues of the MDs for the availability of the required service(s). If these are not available, the E2E SMD may wait for them to become available, or abort the procedure. Once all required domain services are available, the E2E service model may be stored in the E2E service catalogue (D). The E2E service model(s) may include the orchestration and usage of sub-services exposed by the MDs. In addition, the service model(s) may be expected to be available during the verification and setup of the E2E service instantiation. After successful verification, the E2E service template may be stored in the service catalogue for usage in case of a service instantiation. Additionally, the service model(s) may include information that controls the automatic management and orchestration of the service, and other information that is related to how to offer the service in the service catalogue and to order it.

If one or more of the required domain services are not available, the MDs may be prepared for becoming able to provide these services. This may be done by onboarding the related domain service models into the domain service catalogue. Such service models may be the outcome of a service design step that may have an understanding of the inner details of the MD and the resources managed by the service model.

In some instances, the E2E SMD may wait for the domain services to become available, but may not have means to actively request their onboarding. Instead, an operator of the E2E SMD may request the missing service from the subordinated MD by communication outside the management architecture (e.g., mail and/or phone) not integrated into the overall management process. Additionally, the E2E SMD may be defined to detect the act of a service model becoming available by polling the service catalogue exposed by the MD, or by subscribing to notifications that inform about changes to the catalogue.

An alternative proposal may be provided by adding functionality to enable the E2E SMD to "push down" the missing service models into the MDs when onboarding the E2E service. For example, when the missing service models are "pushed down," the service model is onboarded into the MDs in order to start the needed service(s) in the MD, initiated and controlled by the E2E MD. However, this may not work in certain cases because of the requirement to know domain details when designing domain services which are abstracted and encapsulated by the MD.

Figure 3:
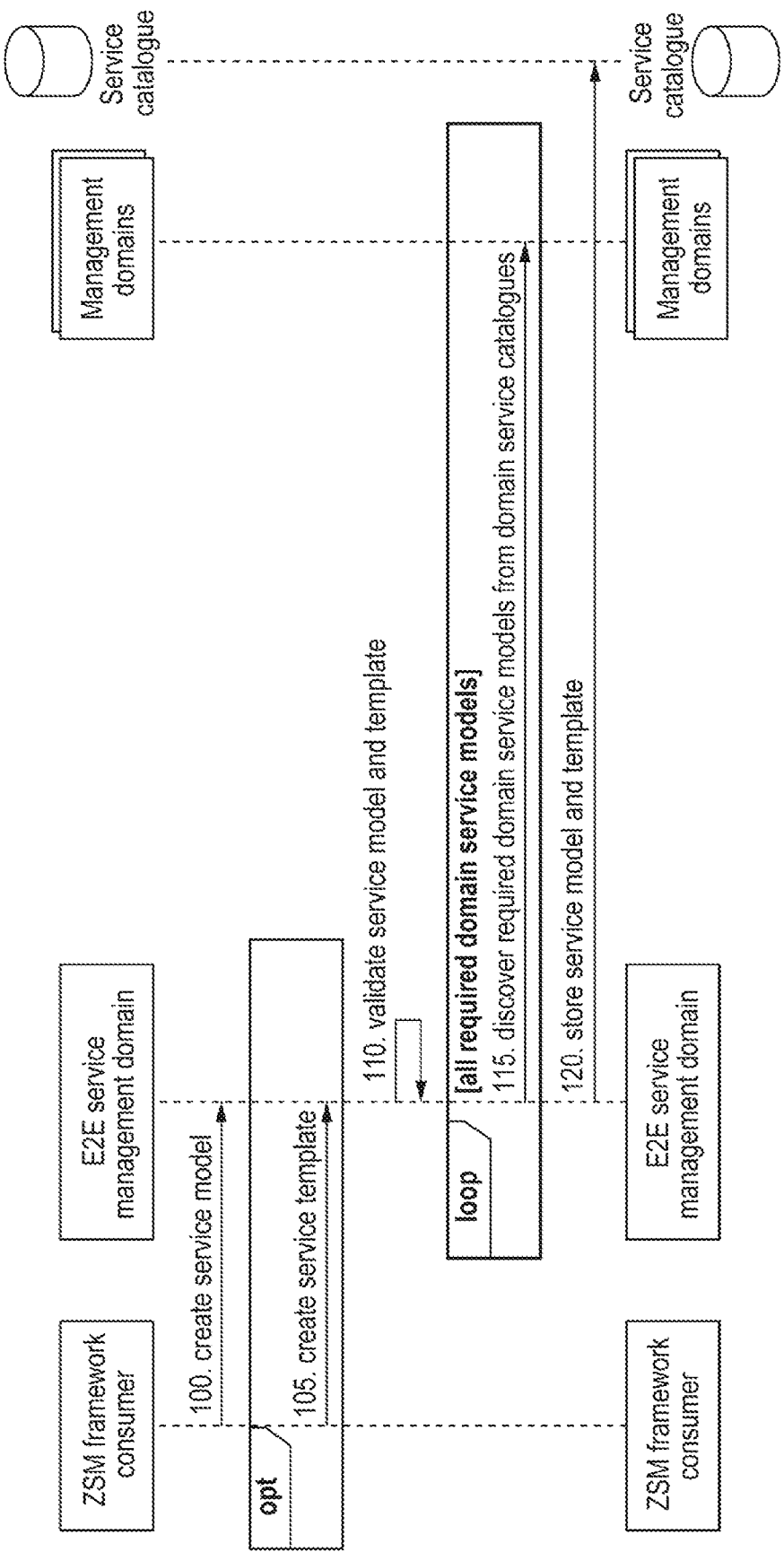
FIG. 3 illustrates an example service model onboarding flow diagram.

FIG. 3 illustrates an example service model onboarding flow diagram. At 100, the ZSM framework consumer creates a service model in the E2E SMD, which includes transmitting the service model content to the E2E SMD. Creation of the service model may refer to creating the model and the template for the E2E service. If the model and template cannot be created/validated, the onboarding process is not completed. At 105, the ZSM framework may create a service template in the E2E SMD, which includes transmitting the service template content to the E2E SMD. At 110, the E2E SMD validates the service model and the template. At 115, the E2E SMD builds the list of those existing domain service models in the service catalogues of the MDs that relate to domain services required to build the E2E service. If one or more domain services are missing, the precondition for the E2E SMD proceeding to making the model for the E2E service available in the E2E service catalogue is not fulfilled. In this case, as the E2E SMD may not have means to request the MDs to prepare and to onboard the missing service models. Instead, the E2E SMD can now either passively wait and repeat the discovery until the services are made available in the management domain (by means outside the scope of the flow), or abort the procedure. At 120, the E2E SMD stores the service model and template in the service catalogue.

To resolve some of the potential drawbacks described above, the surrounding loop may be executed multiple times, waiting each time, and then repeating the discovery. In doing so, an assumption may be made that the MDs may provide additional service models at their own initiative.

Alternatively, the procedure of onboarding an E2E service model may be declared as failed.

In some cases, management operations may be defined to allow for creating, reading, updating, deleting, and listing domain service models. However, the management operations "create", "update" and "delete" may not be required to be supported by the management domain, to allow a domain hiding its internal details. This may suggest that external entities may not be able to onboard a domain service if the operations are not supported, depending on the organization of the management domain. In addition, functions to add "service candidates" to a service catalogue may be defined. However, this may not solve the problem in case the E2E SMD does not have the right to access these functions, or an E2E service designer has no possibility to create service models for the needed domain services because she/he has no access to the necessary knowledge of domain details which is available to the domain owner.

Figure 4:
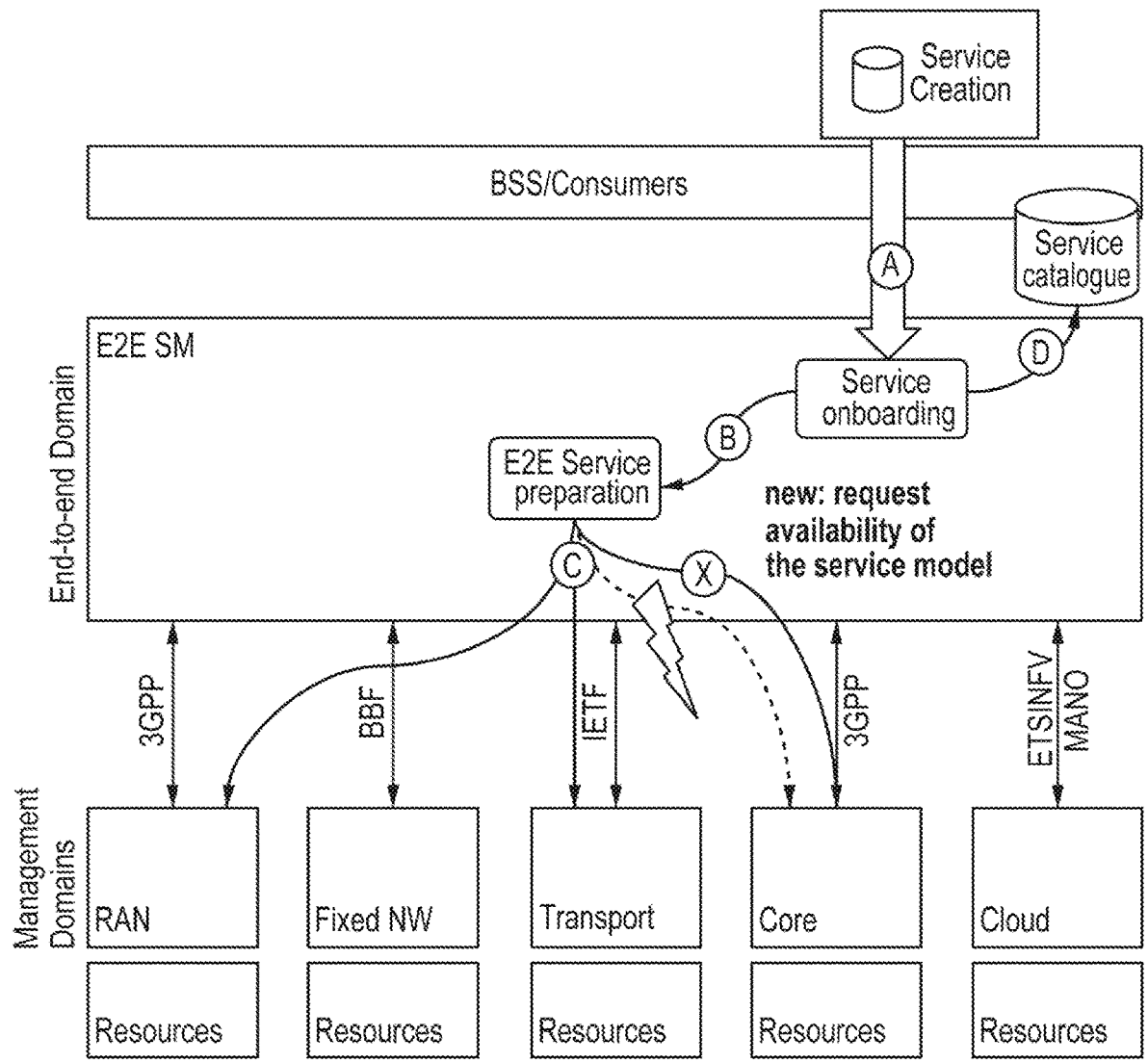
FIG. 4 illustrates an example of a management request during E2E service onboarding, according to certain example embodiments.

FIG. 4 illustrates an example of a management request during E2E service onboarding, according to certain example embodiments. In particular, certain example embodiments may add a new message to onboarding methods that allows the E2E SMD to inform the MD of the need of an additional service in its service catalogue. As illustrated in the example of FIG. 4, step (X) may represent a new request that is sent in case a check on availability of a required domain service was not successful. According to certain example embodiments, the availability of the information to inform the MD may allow the MD or its owner to onboard the required service models without breaking the abstraction boundary between the MDs and the E2E SMD.

According to certain example embodiments, the required additional service may be specified by a name and category in line with the structure of the service catalogue. According to other example embodiments, the required additional service may also be specified by a template that may include relevant parameters of the desired additional service. In some example embodiments, the parameters of desired additional service may include service level agreement (SLA) parameters, and may be different per service. For instance, the parameters may include bandwidth, latency, and other similar parameters. Such information may then be used by the MD to prepare for providing the desired additional service, and for announcing the capability to provide the service in its service catalogue.

Figure 5:
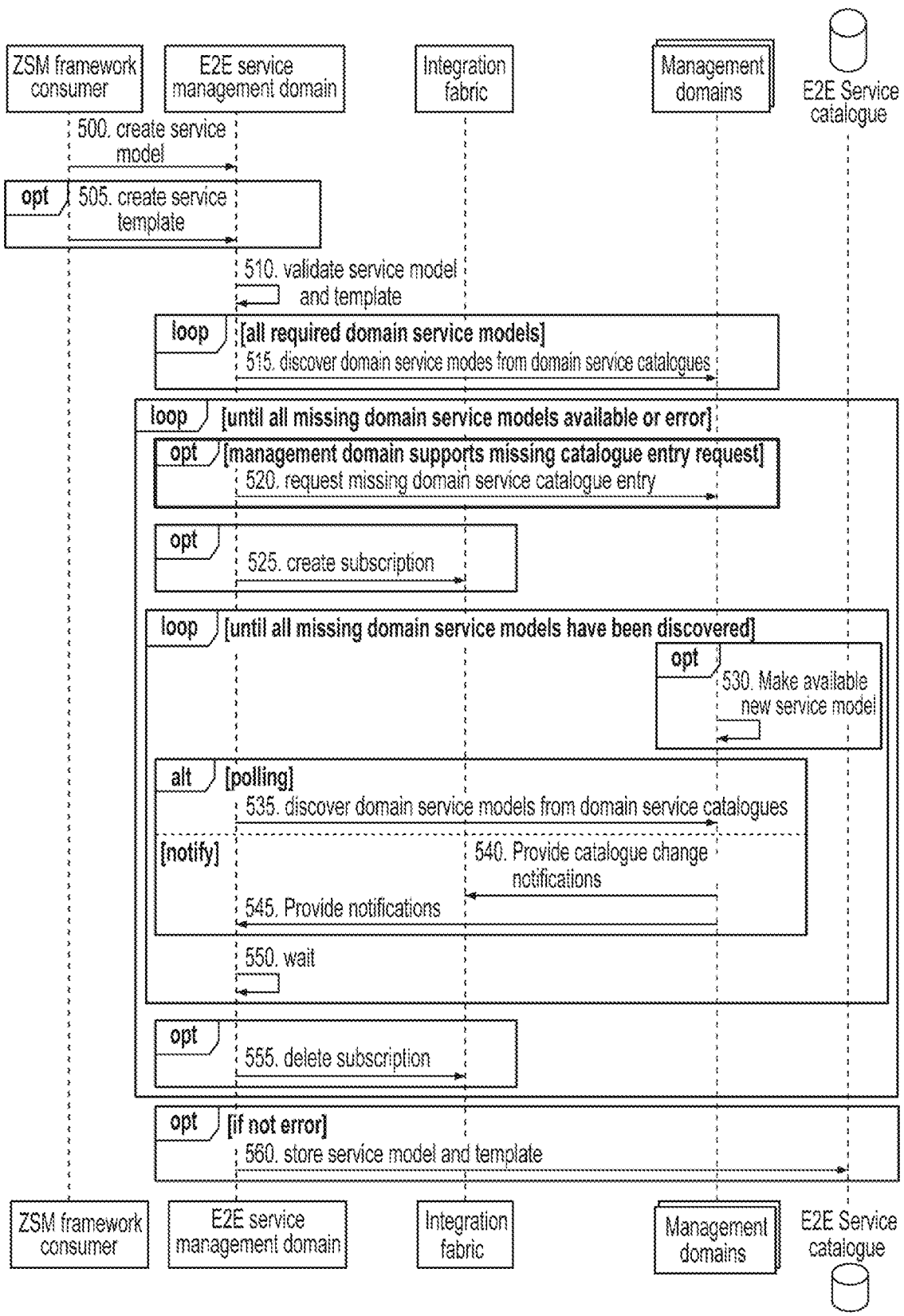
FIG. 5 illustrates an example flow diagram that requests missing domain service catalogue entries, according to certain example embodiments.

FIG. 5 illustrates an example flow diagram that requests missing domain service catalogue entries, according to certain example embodiments. At 500, the ZSM framework consumer creates a service model in the E2E SMD, which includes transmitting the service model to the E2E SMD. As described above, creation of the service model may refer to creating the model and the template for the E2E service. If the model and template cannot be created/validated, the onboarding process is not completed. At 505, the ZSM framework may create a service template in the E2E SMD, which includes transmitting the service template content to the E2E SMD. At 510, the E2E SMD validates the service model and the template. At 515, the E2E SMD builds the list of those existing domain service models in the service catalogues of the MDs that relate to domain services required to build the E2E service. If one or more domain services are missing, the precondition for the E2E SMD proceeding to making the model for the E2E service available in the E2E service catalogue is not fulfilled. In this case, as the E2E SMD may not have means to request the MDs to prepare and to onboard the missing service models. Instead, the E2E SMD can now either passively wait and repeat the discovery until the services are made available in the management domain (by means outside the scope of the flow), or abort the procedure. At 520, the E2E SMD may signal to the MD the need to provide an additional service by requesting a missing domain service catalogue entry. Operations 525-550 describe a way that the E2D SMD waits for the state that required domain service models are available. According to certain example embodiments, if this condition is fulfilled, the E2E SMD may invoke a procedure to instantiate an E2E service.

In certain example embodiments, the procedure illustrated in the example of FIG. 5 may be inherently asynchronous. As illustrated in the example of FIG. 5, to procedure may include at least two alternatives for the E2D SMD to understand if the requested new service has been made available by a MD. For example, at 525, the E2E SMD may create a subscription to subscribe to notifications about service catalogue changes. According to certain example embodiments, if a new service model is onboarded into the service catalogue, such notification may be triggered. The use of the integration fabric for proxying subscriptions and notifications may be optional. At 530, the MD may optionally make the new service model available.

Another alternative for the E2E SMD to understand if the requested new service has been made available by a MD is, at 535, polling the service catalogue of the MD to search for changes. In other words, the E2E SMD may discover domain service models from the domain service catalogues. According to certain example embodiments, each MD may have its own service catalogue to register their local services. In addition, the E2E may check the availability of the MD service model in the MD service catalogue (i.e., it may check whether a service based on that model can be ordered/instantiated). Once the domain service models are found, at 540, the MD provides the catalogue change notification to the integration fabric. Then, at 545, the integration fabric provides the notifications to the E2E SMD. At 550, the wait loop terminates when all the missing service models have been provided to the consumer (e.g., from now on, services can be instantiated (i.e., provided) by the E2E SMD) or if the E2E SMD decides to not wait any longer (e.g., an error case). At 555, at the end of the procedure, the E2E SMD may delete the subscription made at 525. At 560, the service model and template may be stored in the service catalogue.

Figure 6:
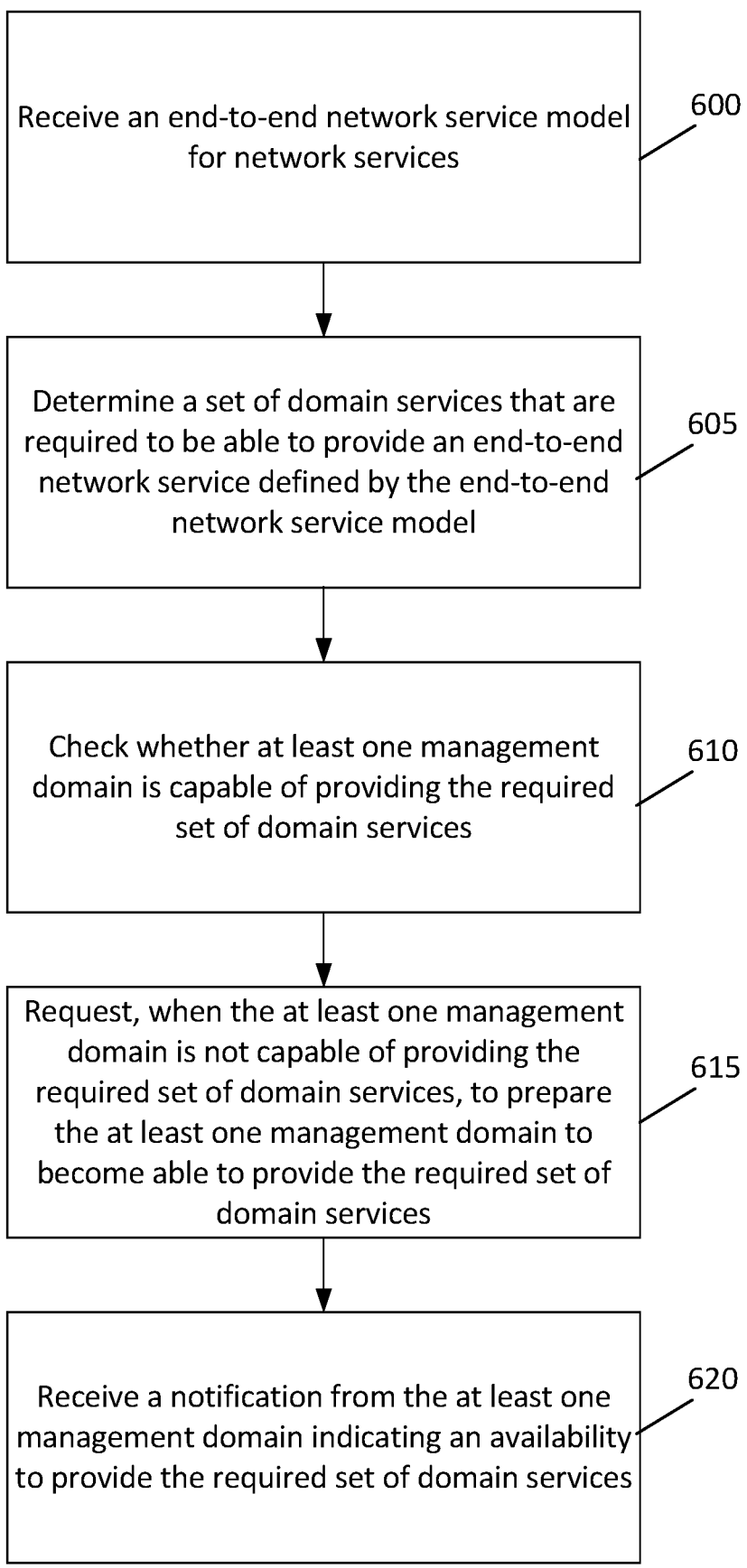
FIG. 6 illustrates an example flow diagram of a method, according to certain example embodiments.

FIG. 6 illustrates an example flow diagram of a method, according to certain example embodiments. In an example embodiment, the method of FIG. 6 may be performed by a network entity, network node, or a group of multiple network elements in a 3GPP system, such as LTE or 5G-NR. For instance, in an example embodiment, the method of FIG. 6 may be performed by a E2E SMD, for instance, similar to apparatuses 10 or 20 illustrated in FIG. 8(a) or 8(b).

According to certain example embodiments, the method of FIG. 6 may include, at 600, receiving an end-to-end network service model for network services. At 605, the method may include determining a set of domain services that are required to be able to provide an end-to-end network service defined by the end-to-end network service model. At 610, the method may include checking whether at least one management domain is capable of providing the required set of domain services. At 615, the method may include requesting, when the at least one management domain is not capable of providing the required set of domain services, to prepare the at least one management domain to become able to provide the required set of domain services. At 620, the method may include receiving a notification from the at least one management domain indicating an availability to provide the required set of domain services.

According to certain example embodiments, the method may further include creating a subscription with the at least one management domain for receiving the notification. According to other example embodiments, the subscription may be created with an integration fabric acting as a distributor for notification. According to some example embodiments, the method may also include polling a management domain service catalogue to search for changes in domain service models stored in a management domain service catalogue.

In certain example embodiments, the subscription or the polling may be maintained until the requested domain service model is available. In some example embodiments, the request to prepare the at least on management domain may include a service model management request only for services that are missing. In other example embodiments, the method may also include determining, based on the notification, that the request has been fulfilled.

Figure 7:
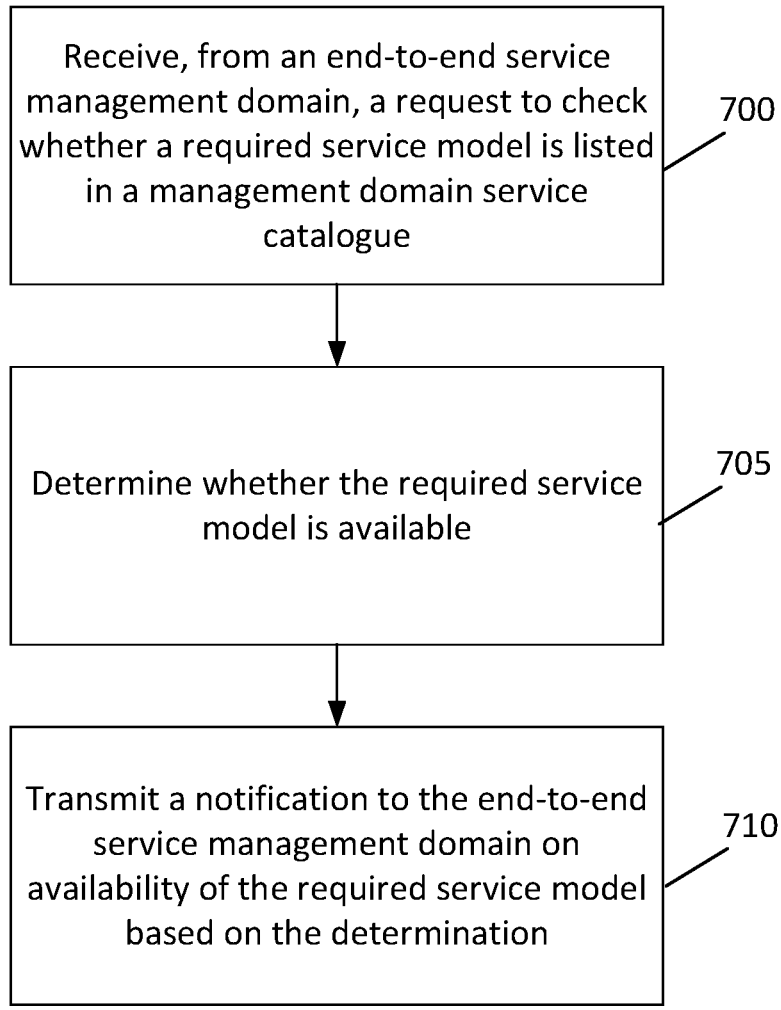
FIG. 7 illustrates an example flow diagram of another method, according to certain example embodiments.

FIG. 7 illustrates an example flow diagram of another method, according to certain example embodiments. In an example embodiment, the method of FIG. 7 may be performed by a network entity, network node, or a group of multiple network elements in a 3GPP system, such as LTE or 5G-NR. For instance, in an example embodiment, the method of FIG. 7 may be performed by a MD, for instance, similar to apparatuses 10 or 20 illustrated in FIG. 8(a) or 8(b).

According to certain example embodiments, the method of FIG. 7 may include, at 700, the method may include receiving, from an end-to-end service management domain, a request to check whether a required service model is listed in a management domain service catalogue. At 705, the method may include determining whether the required service model is available. At 710, the method may include transmitting a notification to the end-to-end service management domain on availability of the required service model based on the determination.

According to certain example embodiments, the method may also include receiving a subscription for transmitting the notification about service catalogue changes related to the requested service. According to some example embodiments, the method may further include receiving a polling request to search for changes in service models stored in a management domain service catalogue. According to other example embodiments, the subscription or the polling may be maintained until the required service model is available. In certain example embodiments, the notification may be transmitted directly from a management domain or via an integration fabric.

Figure 8A:
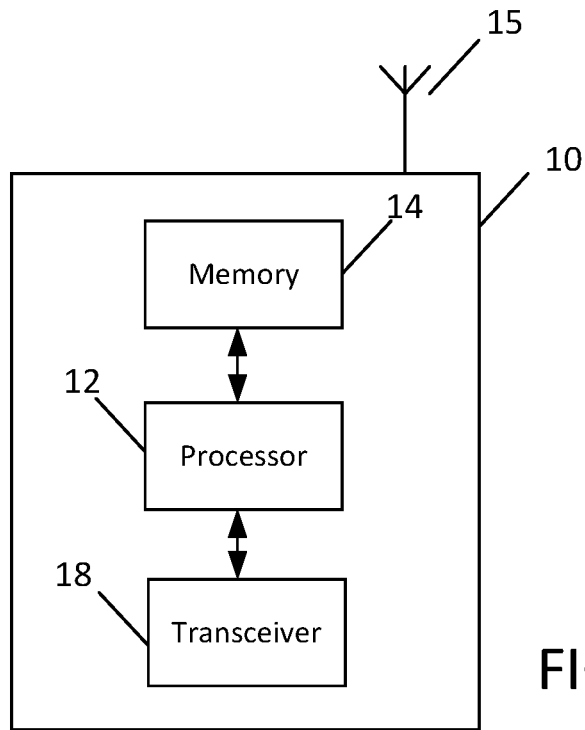
FIG. 8(a) illustrates an apparatus, according to certain example embodiments.
Figure 8B:
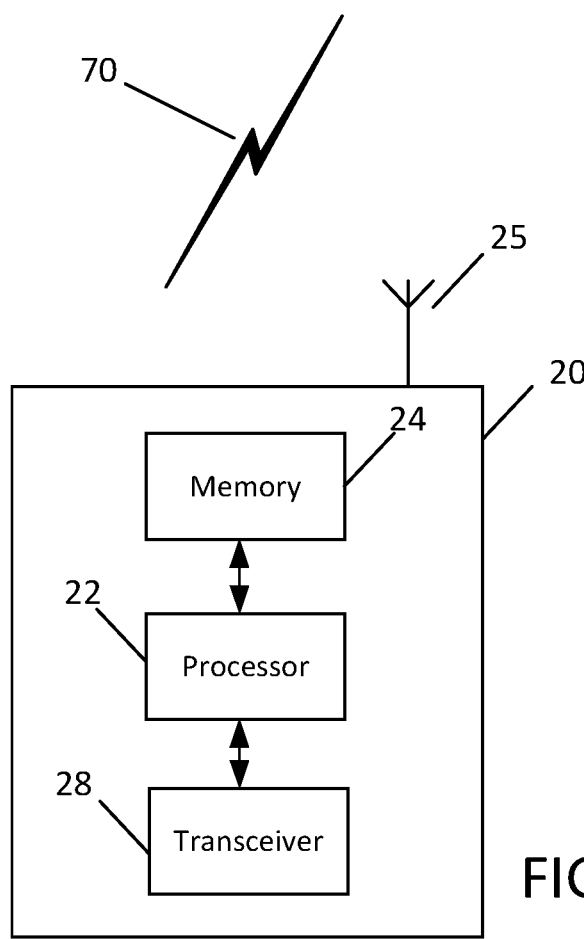
FIG. 8(b) illustrates another apparatus, according to certain example embodiments.

FIG. 8(a) illustrates an apparatus 10 according to certain example embodiments. In certain example embodiments, apparatus 10 may be a node or element in a communications network or associated with such a network, such as a network, a base station, a Node B, an evolved Node B (eNB), 5G Node B or access point, next generation Node B (NG-NB or gNB), NM, BS, E2E SMD, MD, and/or WLAN access point, associated with a radio access network (RAN), such as an LTE network, 5G or NR. It should be noted that one of ordinary skill in the art would understand that apparatus 10 may include components or features not shown in FIG. 8(a).

In some example embodiments, apparatus 10 may include one or more processors, one or more computer-readable storage medium (for example, memory, storage, or the like), one or more radio access components (for example, a modem, a transceiver, or the like), and/or a user interface. In some example embodiments, apparatus 10 may be configured to operate using one or more radio access technologies, such as GSM, LTE, LTE-A, NR, 5G, WLAN, WiFi, NB-IoT, Bluetooth, NFC, MulteFire, and/or any other radio access technologies. It should be noted that one of ordinary skill in the art would understand that apparatus 10 may include components or features not shown in FIG. 8(a).

As illustrated in the example of FIG. 8(a), apparatus 10 may include or be coupled to a processor 12 for processing information and executing instructions or operations. Processor 12 may be any type of general or specific purpose processor. In fact, processor 12 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 12 is shown in FIG. 8(a), multiple processors may be utilized according to other example embodiments. For example, it should be understood that, in certain example embodiments, apparatus 10 may include two or more processors that may form a multiprocessor system (e.g., in this case processor 12 may represent a multiprocessor) that may support multiprocessing. According to certain example embodiments, the multiprocessor system may be tightly coupled or loosely coupled (e.g., to form a computer cluster).

Processor 12 may perform functions associated with the operation of apparatus 10 including, as some examples, precoding of antenna gain/phase parameters, encoding and decoding of individual bits forming a communication message, formatting of information, and overall control of the apparatus 10, including processes illustrated in FIGS. 1-6.

Apparatus 10 may further include or be coupled to a memory 14 (internal or external), which may be coupled to processor 12, for storing information and instructions that may be executed by processor 12. Memory 14 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 14 can be comprised of any combination of random access memory (RAM), read only memory (ROM), static storage such as a magnetic or optical disk, hard disk drive (HDD), or any other type of non-transitory machine or computer readable media. The instructions stored in memory 14 may include program instructions or computer program code that, when executed by processor 12, enable the apparatus 10 to perform tasks as described herein.

In certain example embodiments, apparatus 10 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 12 and/or apparatus 10 to perform any of the methods illustrated in FIGS. 1-6.

In some example embodiments, apparatus 10 may also include or be coupled to one or more antennas 15 for receiving a downlink signal and for transmitting via an uplink from apparatus 10. Apparatus 10 may further include a transceiver 18 configured to transmit and receive information. The transceiver 18 may also include a radio interface (e.g., a modem) coupled to the antenna 15. The radio interface may correspond to a plurality of radio access technologies including one or more of GSM, LTE, LTE-A, 5G, NR, WLAN, NB-IoT, Bluetooth, BT-LE, NFC, RFID, UWB, and the like. The radio interface may include other components, such as filters, converters (for example, digital-to-analog converters and the like), symbol demappers, signal shaping components, an Inverse Fast Fourier Transform (IFFT) module, and the like, to process symbols, such as OFDMA symbols, carried by a downlink or an uplink.

For instance, transceiver 18 may be configured to modulate information on to a carrier waveform for transmission by the antenna(s) 15 and demodulate information received via the antenna(s) 15 for further processing by other elements of apparatus 10. In other example embodiments, transceiver 18 may be capable of transmitting and receiving signals or data directly. Additionally or alternatively, in some example embodiments, apparatus 10 may include an input and/or output device (I/O device). In certain example embodiments, apparatus 10 may further include a user interface, such as a graphical user interface or touchscreen.

In certain example embodiments, memory 14 stores software modules that provide functionality when executed by processor 12. The modules may include, for example, an operating system that provides operating system functionality for apparatus 10. The memory may also store one or more functional modules, such as an application or program, to provide additional functionality for apparatus 10. The components of apparatus 10 may be implemented in hardware, or as any suitable combination of hardware and software. According to certain example embodiments, apparatus 10 may optionally be configured to communicate with apparatus 20 via a wireless or wired communications link 70 according to any radio access technology, such as NR.

According to certain example embodiments, processor 12 and memory 14 may be included in or may form a part of processing circuitry or control circuitry. In addition, in some example embodiments, transceiver 18 may be included in or may form a part of transceiving circuitry.

For instance, in certain example embodiments, apparatus 10 may be controlled by memory 14 and processor 12 to receive an end-to-end network service model for network services. Apparatus 10 may also be controlled by memory 14 and processor 12 to determine a set of domain services that are required to be able to provide an end-to-end network service defined by the end-to-end network service model. Apparatus 10 may further be controlled by memory 14 and processor 12 to check whether at least one management domain is capable of providing the required set of domain services. In addition, apparatus 10 may be controlled by memory 14 and processor 12 to request, when the at least one management domain is not capable of providing the required set of domain services, to prepare the at least one management domain to become able to provide the required set of domain services. Further, apparatus 10 may be controlled by memory 14 and processor 12 to receive a notification from the at least management domain indicating an availability to provide the required set of domain services.

FIG. 8(*b*) illustrates an apparatus 20 according to certain example embodiments. In certain example embodiments, the apparatus 20 may be a node or element in a communications network or associated with such a network, such as a base station, a Node B, an evolved Node B (eNB), 5G Node B or access point, next generation Node B (NG-NB or gNB), NM, BS, E2E SMD, MD, and/or WLAN access point, associated with a radio access network (RAN), such as an LTE network, 5G or NR. It should be noted that one of ordinary skill in the art would understand that apparatus 20 may include components or features not shown in FIG. 8(*b*).

As illustrated in the example of FIG. 8(*b*), apparatus 20 may include a processor 22 for processing information and executing instructions or operations. Processor 22 may be any type of general or specific purpose processor. For example, processor 22 may include one or more of general-purpose computers, special purpose computers, microprocessors, digital signal processors (DSPs), field-programmable gate arrays (FPGAs), application-specific integrated circuits (ASICs), and processors based on a multi-core processor architecture, as examples. While a single processor 22 is shown in FIG. 8(*b*), multiple processors may be utilized according to other example embodiments. For example, it should be understood that, in certain example embodiments, apparatus 20 may include two or more processors that may form a multiprocessor system (e.g., in this case processor 22 may represent a multiprocessor) that may support multiprocessing. In certain example embodiments, the multiprocessor system may be tightly coupled or loosely coupled (e.g., to form a computer cluster).

According to certain example embodiments, processor 22 may perform functions associated with the operation of apparatus 20, which may include, for example, precoding of antenna gain/phase parameters, encoding and decoding of individual bits forming a communication message, formatting of information, and overall control of the apparatus 20, including processes illustrated in FIGS. 1-5 and 7.

Apparatus 20 may further include or be coupled to a memory 24 (internal or external), which may be coupled to processor 22, for storing information and instructions that may be executed by processor 22. Memory 24 may be one or more memories and of any type suitable to the local application environment, and may be implemented using any suitable volatile or nonvolatile data storage technology such as a semiconductor-based memory device, a magnetic memory device and system, an optical memory device and system, fixed memory, and/or removable memory. For example, memory 24 can be comprised of any combination of random access memory (RAM), read only memory (ROM), static storage such as a magnetic or optical disk, hard disk drive (HDD), or any other type of non-transitory machine or computer readable media. The instructions stored in memory 24 may include program instructions or computer program code that, when executed by processor 22, enable the apparatus 20 to perform tasks as described herein.

In certain example embodiments, apparatus 20 may further include or be coupled to (internal or external) a drive or port that is configured to accept and read an external computer readable storage medium, such as an optical disc, USB drive, flash drive, or any other storage medium. For example, the external computer readable storage medium may store a computer program or software for execution by processor 22 and/or apparatus 20 to perform the methods illustrated in FIGS. 1-5 and 7.

In certain example embodiments, apparatus 20 may also include or be coupled to one or more antennas 25 for transmitting and receiving signals and/or data to and from apparatus 20. Apparatus 20 may further include or be coupled to a transceiver 28 configured to transmit and receive information. The transceiver 28 may include, for example, a plurality of radio interfaces that may be coupled to the antenna(s) 25. The radio interfaces may correspond to a plurality of radio access technologies including one or more of GSM, NB-IoT, LTE, 5G, WLAN, Bluetooth, BT- LE, NFC, radio frequency identifier (RFID), ultrawideband (UWB), MulteFire, and the like. The radio interface may include components, such as filters, converters (for example, digital-to-analog converters and the like), mappers, a Fast Fourier Transform (FFT) module, and the like, to generate symbols for a transmission via one or more downlinks and to receive symbols (for example, via an uplink).

As such, transceiver 28 may be configured to modulate information on to a carrier waveform for transmission by the antenna(s) 25 and demodulate information received via the antenna(s) 25 for further processing by other elements of apparatus 20. In other example embodiments, transceiver 18 may be capable of transmitting and receiving signals or data directly. Additionally or alternatively, in some example embodiments, apparatus 20 may include an input and/or output device (I/O device).

In certain example embodiment, memory 24 may store software modules that provide functionality when executed by processor 22. The modules may include, for example, an operating system that provides operating system functionality for apparatus 20. The memory may also store one or more functional modules, such as an application or program, to provide additional functionality for apparatus 20. The components of apparatus 20 may be implemented in hardware, or as any suitable combination of hardware and software.

According to some example embodiments, processor 22 and memory 24 may be included in or may form a part of processing circuitry or control circuitry. In addition, in some example embodiments, transceiver 28 may be included in or may form a part of transceiving circuitry.

As used herein, the term "circuitry" may refer to hardware-only circuitry implementations (e.g., analog and/or digital circuitry), combinations of hardware circuits and software, combinations of analog and/or digital hardware circuits with software/firmware, any portions of hardware processor(s) with software (including digital signal processors) that work together to cause an apparatus (e.g., apparatus 10 and 20) to perform various functions, and/or hardware circuit(s) and/or processor(s), or portions thereof, that use software for operation but where the software may not be present when it is not needed for operation. As a further example, as used herein, the term "circuitry" may also cover an implementation of merely a hardware circuit or processor (or multiple processors), or portion of a hardware circuit or processor, and its accompanying software and/or firmware. The term circuitry may also cover, for example, a baseband integrated circuit in a server, cellular network node or device, or other computing or network device.

In other example embodiments, apparatus 20 may be controlled by memory 24 and processor 22 to receive, from an end-to-end service management domain, a request to check whether a required service model is listed in a management domain service catalogue. Apparatus 20 may also be controlled by memory 24 and processor 22 to determine whether the required service model is available. Apparatus 20 may further be controlled by memory 24 and processor 22 to transmit a notification to the end-to-end service management domain an availability of the required service model based on the determination.

In some example embodiments, an apparatus (e.g., apparatus 10 and/or apparatus 20) may include means for performing a method, a process, or any of the variants discussed herein. Examples of the means may include one or more processors, memory, controllers, transmitters, receivers, and/or computer program code for causing the performance of the operations.

Certain example embodiments may be directed to an apparatus that includes means for receiving an end-to-end network service model for network services. The apparatus may also include means for determining a set of domain services that are required to be able to provide an end-to-end network service defined by the end-to-end network service model. The apparatus may further include means for checking whether at least one management domain is capable of providing the required set of domain services. In addition, the apparatus may include means for requesting, when the at least one management domain is not capable of providing the required set of domain services, to prepare the at least one management domain to become able to provide the required set of domain services. Further, the apparatus may include means for receiving a notification from the at least management domain indicating an availability to provide the required set of domain services.

Other example embodiments may be directed to an apparatus that includes means for receiving, from an end-to-end service management domain, a request to check whether a required service model is listed in a management domain service catalogue. The apparatus may also include means for determining whether the required service model is available. The apparatus may further include means for transmitting a notification to the end-to-end service management domain an availability of the required service model based on the determination.

Certain example embodiments described herein provide several technical improvements, enhancements, and/or advantages. In some example embodiments, it may be possible to allow the E2E SMD to inform the MD of a need of an additional service in its service catalogue. Making such information available to the MD may allow the MD or its owner to onboard any needed service models without breaking the abstraction boundary between the management domains and the E2E SMD.

In some example embodiments, an apparatus may include or be associated with at least one software application, module, unit or entity configured as arithmetic operation(s), or as a program or portions of programs (including an added or updated software routine), which may be executed by at least one operation processor or controller. Programs, also called program products or computer programs, including software routines, applets and macros, may be stored in any apparatus-readable data storage medium and may include program instructions to perform particular tasks. A computer program product may include one or more computer-executable components which, when the program is run, are configured to carry out some example embodiments. The one or more computer-executable components may be at least one software code or portions of code. Modifications and configurations required for implementing the functionality of an example embodiment may be performed as routine(s), which may be implemented as added or updated software routine(s). In one example, software routine(s) may be downloaded into the apparatus As an example, software or a computer program code or portions of it may be in a source code form, object code form, or in some intermediate form, and it may be stored in some sort of carrier, distribution medium, or computer readable medium, which may be any entity or device capable of carrying the program. Such carriers may include a record medium, computer memory, read-only memory, photoelectrical and/or electrical carrier signal, telecommunications signal, and software distribution package, for example. Depending on the processing power needed, the computer program may be executed in a single electronic digital computer or it may be distributed amongst a number of computers. The computer readable medium or computer readable storage medium may be a non-transitory medium.

In other example embodiments, the functionality may be performed by hardware or circuitry included in an apparatus (e.g., apparatus 10 or apparatus 20), for example through the use of an application specific integrated circuit (ASIC), a programmable gate array (PGA), a field programmable gate array (FPGA), or any other combination of hardware and software. In yet another example embodiment, the functionality may be implemented as a signal, a non-tangible means that can be carried by an electromagnetic signal downloaded from the Internet or other network.

According to certain example embodiments, an apparatus, such as a node, device, or a corresponding component, may be configured as circuitry, a computer or a microprocessor, such as single-chip computer element, or as a chipset, including at least a memory for providing storage capacity used for arithmetic operation and an operation processor for executing the arithmetic operation.

One having ordinary skill in the art will readily understand that the invention as discussed above may be practiced with procedures in a different order, and/or with hardware elements in configurations which are different than those which are disclosed. Therefore, although the invention has been described based upon these example embodiments, it would be apparent to those of skill in the art that certain modifications, variations, and alternative constructions would be apparent, while remaining within the spirit and scope of example embodiments. Although the above embodiments refer to 5G NR and LTE technology, the above embodiments may also apply to any other present or future 3GPP technology, such as LTE-advanced, and/or fourth generation (4G) technology.

Partial Glossary

3GPP 3rd Generation Partnership Project
5G 5th Generation
5GCN 5G Core Network
BBF Broadband Forum
BS Base Station
E2E End-to-End
eNB Enhanced Node B
ETSI European Telecommunications Standards Institute
gNB 5G or Next Generation NodeB
GS Group Specification
IETF Internet Engineering Task Force
LTE Long Term Evolution
MD Management Domain
NR New Radio
SMD Service Management Domain
TMF Telemanagement Forum
UE User Equipment
ZSM Zero-Touch Network and Service Management

We claim:

1. A method, comprising:
receiving an end-to-end network service model for network services;
determining a set of domain services that are required to be able to provide an end-to-end network service defined by the end-to-end network service model;
checking whether at least one management domain is capable of providing the required set of domain services;
requesting, when the at least one management domain is not capable of providing the required set of domain services, to prepare the at least one management domain to become able to provide the required set of domain services; and
receiving a notification from the at least one management domain indicating an availability to provide the required set of domain services.

2. The method according to claim 1, further comprising: creating a subscription with the at least one management domain for receiving the notification.

3. The method according to claim 2, wherein the subscription is created with an integration fabric acting as a distributor for notifications.

4. The method according to claim 1, further comprising: polling a management domain service catalogue to search for changes in domain service models stored in a management domain service catalogue.

5. The method according to claim 2, wherein the subscription is maintained until the requested domain service model is available.

6. The method according to claim 1, wherein the request to prepare the at least one management domain comprises a service model management request only for services that are missing.

7. The method according to claim 1, further comprising: determining, based on the notification, that the request has been fulfilled.

8. A method, comprising:
receiving, from an end-to-end service management domain, a request to check whether a required service model is listed in a management domain service catalogue;
determining whether the required service model is available; and
transmitting a notification to the end-to-end service management domain on availability of the required service model based on the determination.

9. The method according to claim 8, further comprising: receiving a subscription for transmitting the notification about service catalogue changes related to the requested service.

10. The method according to claim 8, further comprising: receiving a polling request to search for changes in service models stored in a management domain service catalogue.

11. The method according to claim 9, wherein the subscription is maintained until the required service model is available.

12. The method according to claim 8, wherein the notification is transmitted directly from a management domain or via an integration fabric.

13. An apparatus, comprising:
at least one processor; and
at least one memory comprising computer program code, the at least one memory and the computer program code are configured, with the at least one processor, to cause the apparatus at least to
receive an end-to-end network service model for network services;
determine a set of domain services that are required to be able to provide an end-to-end network service defined by the end-to-end network service model;
check whether at least one management domain is capable of providing the required set of domain services;
request, when the at least one management domain is not capable of providing the required set of domain services, to prepare the at least one management domain to become able to provide the required set of domain services; and receive a notification from the at least one management domain indicating an availability to provide the required set of domain services.

14. The apparatus according to claim 13, wherein the at least one memory and the computer program code are further configured, with the at least one processor, to cause the apparatus at least to:

create a subscription with the at least one management domain for receiving the notification.

15. The apparatus according to claim 14, wherein the subscription is created with an integration fabric acting as a distributor for notifications.

16. The apparatus according to claim 13, wherein the at least one memory and the computer program code are further configured, with the at least one processor, to cause the apparatus at least to:

poll a management domain service catalogue to search for changes in domain service models stored in a management domain service catalogue.

17. The apparatus according to claim 14, wherein the subscription is maintained until the requested domain service model is available.

18. The apparatus according to claim 13, wherein the request to prepare the at least on management domain comprises a service model management request only for services that are missing.

19. The apparatus according to claim 13, wherein the at least one memory and the computer program code are further configured, with the at least one processor, to cause the apparatus at least to:

determine, based on the notification, that the request has been fulfilled.

20. An apparatus, comprising:
at least one processor; and
at least one memory comprising computer program code, the at least one memory and the computer program code are configured, with the at least one processor, to cause the apparatus at least to receive, from an end-to-end service management domain, a request to check whether a required service model is listed in a management domain service catalogue;

determine whether the required service model is available; and transmit a notification to the end-to-end service management domain on availability of the required service model based on the determination.

21. The apparatus according to claim 20, wherein the at least one memory and the computer program code are further configured, with the at least one processor, to cause the apparatus at least to:

receive a subscription for transmitting the notification about service catalogue changes related to the requested service.

22. The apparatus according to claim 20, wherein the at least one memory and the computer program code are further configured, with the at least one processor, to cause the apparatus at least to:

receive a polling request to search for changes in service models stored in a management domain service catalogue.

23. The apparatus according to claim 21, wherein the subscription is maintained until the required service model is available.

24. The apparatus according to claim 20, wherein the notification is transmitted directly from a management domain or via an integration fabric.

* * * * *